US008843424B2

(12) United States Patent
Mei et al.

(10) Patent No.: US 8,843,424 B2
(45) Date of Patent: Sep. 23, 2014

(54) DEVICE AND METHOD FOR MULTICLASS OBJECT DETECTION

(75) Inventors: Shiqu Mei, Beijing (CN); Weiguo Wu, Beijing (CN)

(73) Assignee: Sony Corporation, Tokyo (JP)

(*) Notice: Subject to any disclaimer, the term of this patent is extended or adjusted under 35 U.S.C. 154(b) by 312 days.

(21) Appl. No.: 13/257,617

(22) PCT Filed: Mar. 23, 2010

(86) PCT No.: PCT/CN2010/071193
§ 371 (c)(1),
(2), (4) Date: Dec. 9, 2011

(87) PCT Pub. No.: WO2010/111916
PCT Pub. Date: Oct. 7, 2010

(65) Prior Publication Data
US 2012/0089545 A1    Apr. 12, 2012

(30) Foreign Application Priority Data

Apr. 1, 2009   (CN) .......................... 2009 1 0132668

(51) Int. Cl.
*G06F 15/18*   (2006.01)
*G06K 9/62*    (2006.01)

(52) U.S. Cl.
CPC .................................. *G06K 9/6257* (2013.01)
USPC ........................................................ 706/20

(58) Field of Classification Search
None
See application file for complete search history.

(56) References Cited

U.S. PATENT DOCUMENTS

| 5,675,711 | A  | * | 10/1997 | Kephart et al. | ................. | 706/12  |
| 5,907,834 | A  | * | 5/1999  | Kephart et al. | ................. | 706/20  |
| 6,424,960 | B1 | * | 7/2002  | Lee et al.     | ........................ | 706/20  |
| 6,799,170 | B2 | * | 9/2004  | Lee et al.     | ........................ | 706/20  |
| 7,756,313 | B2 | * | 7/2010  | Bi et al.      | ........................ | 382/128 |
| 7,817,855 | B2 | * | 10/2010 | Yuille et al.  | ................... | 382/176 |

(Continued)

FOREIGN PATENT DOCUMENTS

CN    1952954    4/2007
CN    101315670  12/2008

OTHER PUBLICATIONS

Torralba, A. et al., "Sharing Features: Efficient Boosting Procedures for Multiclass Object Detection", IEEE Transactions on Pattern Analysis and Machine Intelligence, vol. 29, Issue 5, pp. 1-8 pp. (854-869), ISSN: 0162-8828, (May 31, 2007).

(Continued)

*Primary Examiner* — Kakali Chaki
*Assistant Examiner* — Fuming Wu
(74) *Attorney, Agent, or Firm* — Oblon, Spivak, McClelland, Maier & Neustadt, L.L.P.

(57) ABSTRACT

The present invention provides a device and method for multiclass object detection, wherein the detection device includes: an input unit configured to input data to be detected; and a joint classifier within which a plurality of strong classifiers capable of processing multiclass object data are included, wherein each of the strong classifiers is acquired by adding a set of weak classifiers together, and each weak classifiers performs a weak classification for the data to be detected by using a feature. A list of shared features is included within the joint classifier, and each feature within the list is shared by one or more weak classifiers belonging to different strong classifiers respectively; and the weak classifiers, which use a same feature and belong to different strong classifiers respectively, have different parameter values from one another.

13 Claims, 8 Drawing Sheets

(56) References Cited

U.S. PATENT DOCUMENTS

| | | | |
|---|---|---|---|
| 7,835,541 B2 * | 11/2010 | Lee et al. | 382/103 |
| 7,876,965 B2 * | 1/2011 | Ai et al. | 382/226 |
| 7,877,334 B2 * | 1/2011 | Kobayashi et al. | 706/12 |
| 7,962,428 B2 * | 6/2011 | Bi et al. | 706/20 |
| 8,401,250 B2 * | 3/2013 | Sangappa et al. | 382/118 |
| 2005/0114313 A1 * | 5/2005 | Campbell et al. | 707/3 |
| 2005/0249401 A1 * | 11/2005 | Bahlmann et al. | 382/159 |
| 2006/0126938 A1 * | 6/2006 | Lee et al. | 382/190 |
| 2006/0212413 A1 * | 9/2006 | Rujan et al. | 706/20 |
| 2007/0077987 A1 * | 4/2007 | Gururajan et al. | 463/22 |
| 2007/0086660 A1 * | 4/2007 | Ai et al. | 382/226 |
| 2007/0154079 A1 | 7/2007 | He et al. | |
| 2008/0075361 A1 * | 3/2008 | Winn et al. | 382/155 |
| 2008/0077543 A1 * | 3/2008 | Kobayashi et al. | 706/12 |
| 2008/0147577 A1 * | 6/2008 | Bi et al. | 706/12 |
| 2008/0154820 A1 * | 6/2008 | Kirshenbaum et al. | 706/20 |
| 2008/0298643 A1 * | 12/2008 | Lawther et al. | 382/118 |
| 2008/0298704 A1 * | 12/2008 | Nachlieli et al. | 382/254 |
| 2009/0034813 A1 * | 2/2009 | Dikmen et al. | 382/131 |
| 2009/0161912 A1 * | 6/2009 | Yatom et al. | 382/103 |
| 2010/0165150 A1 * | 7/2010 | Steinberg et al. | 348/239 |
| 2011/0091098 A1 * | 4/2011 | Yuille et al. | 382/159 |
| 2011/0194779 A1 * | 8/2011 | Zhong et al. | 382/218 |
| 2011/0235901 A1 * | 9/2011 | Hu | 382/159 |
| 2011/0243426 A1 * | 10/2011 | Hu | 382/159 |
| 2011/0243431 A1 * | 10/2011 | Sangappa et al. | 382/164 |
| 2011/0255741 A1 * | 10/2011 | Jung et al. | 382/103 |
| 2012/0089545 A1 * | 4/2012 | Mei et al. | 706/20 |
| 2012/0321142 A1 * | 12/2012 | Trojanova et al. | 382/117 |
| 2013/0272575 A1 * | 10/2013 | Li et al. | 382/103 |

OTHER PUBLICATIONS

Huang, C. et al., "Vector Boosting for Rotation Invariant Multi-View Face Detection", The IEEE International Conference on Computer Vision(ICCV-05), total pages 8 (446-453), (Oct. 20, 2005).

International Search Report issued Jul. 1, 2010 in PCT/CN10/071193 filed Mar. 23, 2010.

* cited by examiner

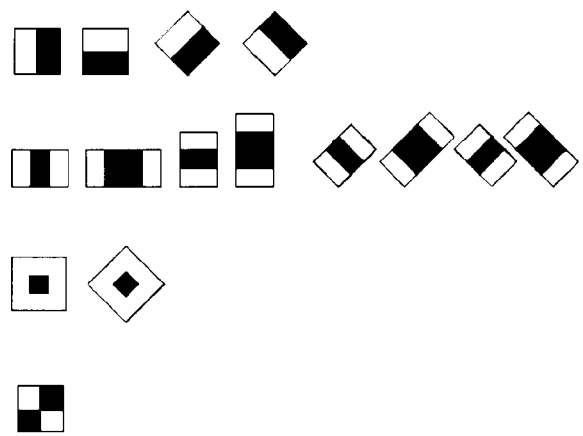
Fig.2
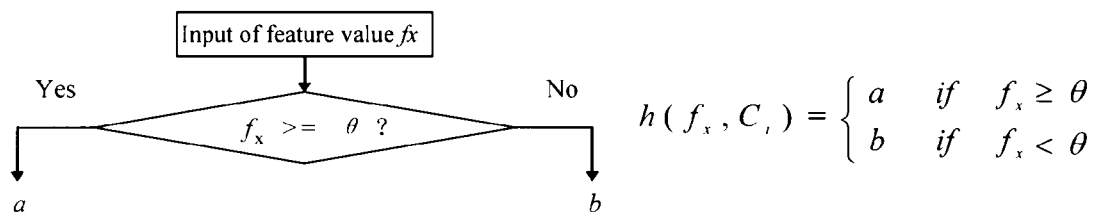
Fig.3a
$$H(C_i) = \begin{cases} 1 & if \ \sum h(C_i) \geq \Theta \\ -1 & if \ \sum h(C_i) < \Theta \end{cases}$$
Fig.3b

|  | $C_1$ | $C_2$ | $C_3$ | ... | $C_m$ |
|---|---|---|---|---|---|
| $f_1$ | $h_1(c_1)$ | $h_1(c_2)$ | $h_1(c_3)$ | ... | $h_1(c_m)$ |
| $f_2$ | $h_2(c_1)$ | 0 | $h_2(c_3)$ | | $h_2(c_m)$ |
| $f_3$ | 0 | $h_3(c_2)$ | 0 | | $h_3(c_m)$ |
| ... | | | ... | | |
| $f_n$ | 0 | $h_n(c_2)$ | $h_n(c_3)$ | | $h_n(c_m)$ |
| $H(C_i)$ | $\sum h_j(c_1)$ | $\sum h_j(c_2)$ | $\sum h_j(c_3)$ | | $\sum h_j(c_m)$ |

Fig.4

DEVICE AND METHOD FOR MULTICLASS OBJECT DETECTION

FIELD OF THE INVENTION

The present invention relates to object detection technique and in particular to a detection device and method for detecting a plurality of classes of object data.

BACKGROUND OF THE INVENTION

It has been increasingly important to detect object data of an image or of other data to be detected with a machine learning method. Particularly detection of an object in an image has become one important branch thereof.

The same class of objects may exhibit rather different states in an image due to a variety of factors, e.g., illumination, an angle of view, an attitude, etc., and this may make it rather difficult to detect an object in the image. Therefore the same class of objects may be classified into a plurality of subclasses for processing, but how to utilize effectively an attribute common to the subclasses and distinguish accurately one of them from another has been an issue for further investigation.

For detection of a multiclass object in an image, sharing of features has been proposed in Document [1] where joint training is performed on multiclass object classifiers and features are shared to the greatest extent among a plurality of classes for a lower cost of calculation. Pure multiclass joint training for sharing of features is rather effective for lowering a cost of calculation and achieves a good effect but suffers from inefficiency, and since a weak classifier is also shared while features are shared, it becomes increasingly difficult to share features in a subsequent segment of a strong classifier. Further to this, a vector boosting tree algorithm has been further proposed in Document [2] to detect human faces in an image, which exhibit different angles of view and different attitude. However features are also forced to be shared among a variety of classes in the algorithm proposed in Document [2] so that this forced sharing of features may make it difficult to perform further training on the classifiers when one of the classes can not share features well with other classes.

REFERENCE DOCUMENTS

[1] A. Torralba, K. P. Murphy, and W. T. Freeman. Sharing Features: Efficient Boosting Procedures for Multiclass Object Detection. CVPR 2004.
[2] C. Huang, H. Ai, Y. Li, and S. Lao. Vector Boosting for Rotation Invariant Multi-View Face Detection. ICCV 2005.

SUMMARY OF THE INVENTION

An object of the invention is to provide a detection device and method for detecting a plurality of classes of object data distinguished from the prior art.

According to an aspect of the invention, there is provides a training method of a detection device for detecting a plurality of classes of object data, which includes:

determining among the plurality of classes an optimum set of classes of feature-shared samples among which features are shared and selecting the optimum features thereof through traversing the features;

constructing weak classifiers using the selected optimum features for the respective classes in the optimum set of classes of feature-sharing samples; and obtaining a feature list of a current level strong classifier through selecting iteratively the optimum features and also constructing a group of weak classifiers respectively for the plurality of classes, thereby obtaining the detection device including a corresponding plurality of strong classifiers capable of processing the plurality of classes.

In the training method of a detection device for detecting a plurality of classes of object data, samples of a plurality of classes are used for training, a set of classes of feature-shared samples is acquired by determining among the plurality of classes those classes among which features are shared with the least error, and weak classifiers are constructed using the selected optimum features for the respective classes in the optimum set of classes of feature-sharing samples, thereby constructing the detection device including the weak classifiers.

A detection device and method for detecting a plurality of classes of object data obtained from the foregoing training method, wherein the detection device includes: an input unit configured to input data to be detected; and a joint classifier including strong classifiers, the number of which corresponds to the number of the classes and which are used for detecting a corresponding class of the object data, respectively, where each of the strong classifiers is obtained from a combination of a group of weak classifiers, and each of the weak classifier performs a weak classification on the data to be detected using a feature, wherein the joint classifier includes a shared features list, and each feature in the shared features list is shared by one or more weak classifiers respectively belonging to different strong classifiers; and the weak classifiers using a same feature and belonging to different strong classifiers have parameter values different from one another. Thus the features are shared among the strong classifiers for the respective classes of an object to lower a cost of calculation, but no classifier is shared among the respective classes to distinguish one class from another.

According to another aspect of the invention, there is provided a training method of a detection device for detecting object data of r classes, where the r classes can be merged into a predetermined multilayer structure step-by-step from coarse to rough according to a predetermined similarity criterion and arranged at the bottom layer as the most finely classified classes, r represents a larger natural number larger than 1, and the training method includes:

training corresponding level classifiers starting with a class at the top layer in a from-coarse-to-fine policy, where each of the level classifiers includes strong classifiers, the number of which corresponds to the number of targeted classes, and the respective level classifiers are connected in series to form the detection device, wherein training one of the level classifiers for detecting m classes includes:

preparing a set of positive samples and a set of negative samples respectively for m classes to be processed by the level classifier, wherein $1 < m \leq r$;

determining among the m classes an optimum set of classes sharing features and selecting optimum features through traversing the features;

constructing weak classifiers from the selected optimum features for the respective classes in the optimum set of classes of feature-shared samples; and obtaining a features list of the current level strong classifier through selecting iteratively the optimum features and also constructing a group of weak classifiers respectively for the m classes, thereby obtaining the level classifier including m strong classifiers capable of processing the m classes.

According to a second aspect, there are provided a detection device and method for detecting a plurality of (r) classes of object data, where the plurality of classes are merged step-by-step into a predetermined multilayer structure according to a similarity criterion and arranged at the bottom layer as the most finely classified classes, and the detection device includes:

an input unit configured to input data to be detected; and a cascade classifier including a plurality of level classifiers connected in series, the plurality of level classifiers being configured to perform a classification respectively on the classes at respective layers in the predetermined multilayer structure according to a from-coarse-to-fine policy and each of the level classifiers comprising strong classifiers the number of which corresponds to the number of the classes being classified, wherein each of the strong classifiers comprises a group of weak classifiers, and each of the weak classifiers performs a weak classification on the data to be detected using a feature, wherein each of the level classifiers includes a shared features list, and each feature in the shared features list is shared by one or more weak classifiers respectively belonging to different strong classifiers; and the weak classifiers using a same feature and belonging to different strong classifiers have parameter values different from one another.

Similarly according to the second aspect of the invention, the detection device acting as a cascade classifier enables the features to be shared among the strong classifiers of the respective classes of an object to lower a cost of calculation, but no classifier is shared among the respective classes to distinguish one class from another. Also for effective processing of a multiclass object, the plurality of classes are firstly merged for processing on a from-coarse-to-fine principle and then divided gradually for refined processing in the process of training the respective level-classifiers.

BRIEF DESCRIPTION OF THE DRAWINGS

The invention as well as the preferred embodiments, objects and advantages of the invention will be better understood from the following detailed description of illustrative embodiments with reference to the drawings, in which:

FIG. 2 illustrates a Haar-like feature prototype used in the training method according to the first embodiment of the invention;

FIG. 3a and FIG. 3b illustrate structures of weak and strong classifiers respectively;

FIG. 4 illustrates classifiers of the detection device obtained from the training method according to the first embodiment of the invention;

DETAILED DESCRIPTION OF THE INVENTION

The invention will be detailed below with reference to the drawings, and it shall be noted that the embodiments described below are merely intended to facilitate understanding of the invention but not to limit the invention in any way.

Training Method of the First Embodiment

A multi-class vehicle (a car, a bus and a truck) is an object to be detected in the first embodiment. It shall be noted that the embodiments of the invention will not be limited to detection of a vehicle in an image and/or video but can also be applicable to detection of other objects (e.g., a multi-angle human face, etc.) in an image and/or video, of even intrusive classification of real-time network data or host data, etc.

Figure 1:
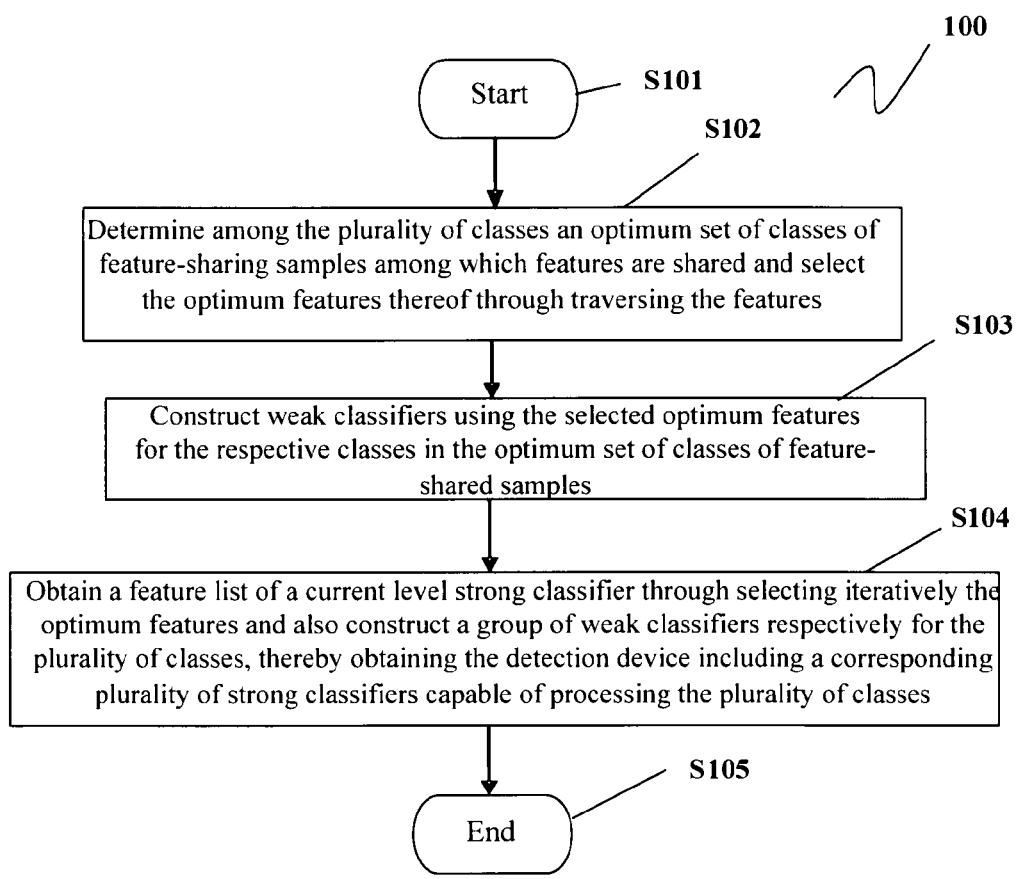
FIG. 1 illustrates a training method of a detection device for detecting a plurality of classes of object data according to a first embodiment of the invention.

FIG. 1 illustrates a training method 100 of a detection device for detecting a plurality of classes of object data according to the first embodiment of the invention.

The method starts with the step S101 of firstly preparing a set of positive samples and a set of negative samples respectively for the plurality of classes. In the present embodiment, a set of a predetermined number of positive samples and a set of a predetermined number of negative samples are prepared respectively for three classes of a vehicle (a car, a bus and a truck). The set of positive samples is a set of vehicle images with the same uniform size of 32×32 pixels of the three respective classes of a vehicle at a front angle of view, and the set of negative samples with a size uniformly scaled to 32×32 pixels are obtained from sampling of a set of background images (a set of images with any size including no target object).

A pool of training features is also prepared. A Haar-like feature prototype is applied to the 32×32 (pixels) images, obtaining hundreds of thousands of specific training features. However it shall be noted that the embodiments of the invention will not be limited to a specific class of features in use, which may be Haar-like feature, Histogram of Orientation Gradient (HOG) feature, Local Binary Pattern (LBP) feature or other features.

Here FIG. 2 illustrates the Haar-like feature prototype in use. A Haar-like feature is a rectangle defined in an image, which includes two parts respectively represented in white and black in FIG. 2 and which is oriented vertically or aslant at an angle of 45 degrees. There are four parameters of the Haar-like feature prototype: the position (x, y) of the rectangle in the image and the size (the width w and the height h) of the rectangle, and tens of thousands of specific Haar-like features applied to the image can be generated with the varying position, size and width to height ratio of the rectangle. The value of a Haar-like feature is a scalar, and the sum of grayscale values of all the pixels is defined in the white region as Sum(W) and in the black region as Sum(B), so the value of the Haar-like feature is calculated in the formula $feature_i = Sum(W) - Sum(B)$.

Training commences in the step S102 of FIG. 1 to determine among the plurality of classes an optimum set of classes of feature-shared samples among which features are shared and select the optimum features thereof through traversing the features. For example, for a plurality of candidate training features, those classes among which features are shared with the least error are determined among the plurality of classes (here three classes) in a forward sequential selection method, etc., a set S of classes of feature-shared samples consisting of the determined classes is selected, and corresponding training features are selected through traversing the features.

After determining the set S of classes of feature-shared samples and the corresponding selected optimum features, weak classifiers are constructed using the selected optimum features for the respective classes in the optimum set of classes of feature-shared samples (the step S103 in FIG. 1). The structure of a weak classifier is as illustrated in FIG. 3a, and in the present embodiment, a decision tree is used as a weak classifier, and each weak classifier is constructed using a Haar-like feature and has two different outputs according to the relationship between an input feature value and a threshold.

The step S104 of FIG. 1 is to obtain a feature list of a current level strong classifier through selecting iteratively the optimum features and also to construct a group of weak classifiers respectively for the plurality of classes (here three classes), thereby obtaining the detection device including a corresponding plurality of strong classifiers capable of processing the plurality of classes. The structure of a strong classifier (an $H(C_i)$ classifier) of each class is as illustrated in FIG. 3b with its output of +1 or −1 and its threshold Θ adjustable as required.

The features used by the weak classifiers $h(C_i)$ are selected from the features list (a group of features) of the classifier. A training process of the classifier is a process of searching for the respective classifiers $H(C_i)$, that is, a process of searching for the weak classifiers $h(C_i)$ for the respective classes, and finally a process of searching iteratively for the features used by the respective weak classifiers, i.e., a process of selecting the features. This process finally results in a group of shared features f.

As can be known to those skilled in the art, the number T of iterations is specified for the iterating step, the weights of the samples are adjusted for the next iteration, weak classifiers are further constructed for the plurality of classes (here three classes), and after the number T of iterations is satisfied, the detection device including all the weak classifiers is obtained and the flow ends (the step S105).

According to the invention, a training termination judgment condition can preferably be adopted for iteration. Expected performance to be achieved for training is set for the classifiers $H(C_i)$ of each class, respectively, and if the expected performance is achieved for a certain class in the training process, then this class will be precluded from the $H(C_i)$ joint training process of the classifier. For example, for each of the classes belonging to the current set of classes of feature-shared samples ($C_i \in S$), a false detection rate $f(C_i) = N_{FA}/N_{Total}$ ($N_{FA}$ represents the number of samples in the set of negative samples mistaken by the classifier for a positive sample, and $N_{Total}$ represents the total number of negative samples) is checked, and if $f(C_i) < f_i$, then the class $C_i$ has satisfied the training termination condition and is precluded from training of the classifier; and if all the classes of samples satisfy the training termination condition, then training of the classifier terminates. If some of the samples do not satisfy the training termination condition, then the weights of the samples are updated for $C_i$ belonging to S ($C_i \in S$): $w_{j,t}^{C_i} = w_{j,t-1}^{C_i} \cdot \exp(-h(f^*_n, C_i, x_j) \cdot z_j^{C_i})$, and the weights of the samples remains unchanged for $C_i \notin S$. All the weights of the samples are normalized so that $\Sigma w_{j,t}^{C_i} = 1$ for the next iteration.

According to the first embodiment of the invention, in the training process of the classifiers, those classes among which features are shared with the least overall error (that is, those classes constituting a set S of classes of feature-shared samples, which is optimum for sharing of features) are determined among all the classes involved in training in a forward sequential selection method, and those features with optimum classification performance for the classes in the set S are selected from the features library, and then the weak classifiers are constructed using the optimum features for the respective classes in the set S. However the invention will not be limited to a forward sequential selection method but the set of classes of feature-shared samples consisting of the determined classes can alternatively selected in another sequential selection method (e.g., a backward sequential selection method, etc.).

Detection Device and Method According to the First Embodiment

In the first embodiment, a strong classifier is trained for each class, where joint training is performed on all the strong classifiers, and the features used by the weak classifiers in the respective strong classifiers are shared between a plurality of classes, but training of the each weak classifier is performed independently for the respective classes. A feature may not be shared by all the classes, that is, a feature may be shared by all or only some of the classes.

The detection device obtained from the training method according to the first embodiment of the invention includes an input unit configured to input data to be detected, a joint classifier including a plurality of strong classifiers and a judgment unit configured to judge a specific class, which the data to be detected belongs to, of object data based on the classification results of the plurality of strong classifiers. Those skilled in the art shall appreciate that a specific judgment criterion and manner of the judgment unit can be set flexibly as required in a practical application or the judgment unit can be omitted but the result of classification by the joint classifier can be obtained directly without departing from the spirit and scope of the invention.

Particularly the joint classifier consisting of a plurality of strong classifiers is as illustrated in FIG. 4, which includes m (m=3 in this embodiment) strong classifiers (which are Boosting classifiers $H(C_i) = \Sigma h j(C_i)$ in the first embodiment). The number of the strong classifiers corresponds to the number m of the classes and the strong classifiers are used for detecting the corresponding classes of the object data respectively, where each of the strong classifiers includes and is obtained from a combination of one or more weak classifiers ($h_j(C_i)$). Each of the weak classifier performs a weak classification on the data to be detected using a feature. The joint classifier includes a shared features list (i.e., a group of shared features), each feature ($f_1 \sim f_n$) in the shared features list is shared by one or more weak classifiers respectively belonging to different strong classifiers (for example, $f_3$ is not used for the strong classifiers $H(C_1)$ and $H(C_3)$), and the weak classifiers using the same feature and belonging to different strong classifiers have parameter values different from one another. Thus the features are shared between the strong classifiers for the respective classes of the object to lower a cost of calculation, but no classifier is shared between the respective classes to distinguish one class from another.

In this detection device, the data to be detected (e.g., a sample image, etc.) is processed respectively by the strong classifiers of all the classes and judged by the judgment unit to thereby allow outputs of more than one strong classifier instead of only one strong classifier to be judged as being positive, and the strong classifiers of the different classes are not mutually exclusive, and certain data to be detected may be judged as object data of a plurality of classes. As long as an output of any strong classifier is judged as being positive by the judgment unit, the output of the detection device is +1; otherwise, the output thereof is −1.

The Second Embodiment

According to the second embodiment of the invention, the detection device for detecting a plurality of classes of object data is designed as a cascade classifier including a plurality of level classifiers connected in series. To this end, firstly classes of samples for training of the respective level classifiers ($SC_k$) of the cascade classifier are designed manually in a predetermined multilayer structure (a first multilayer structure according to the invention). The most finely classified classes (e.g., r classes, where r represents a natural number larger than 1) are arranged at the bottom layer and then merged into a smaller number of coarser classes at a higher layer according to a predetermined similarity criterion, which are in turn merged step-by-step until, for example, one coarse class at the top layer results.

Figure 5A:
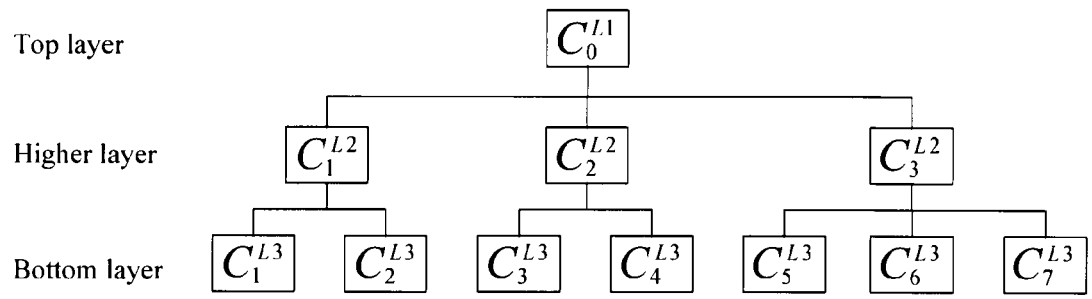
FIG. 5a and FIG. 5b list the use of a Class Tree (CT) structure to represent a change to classes of samples in a training process, respectively.
Figure 5B:
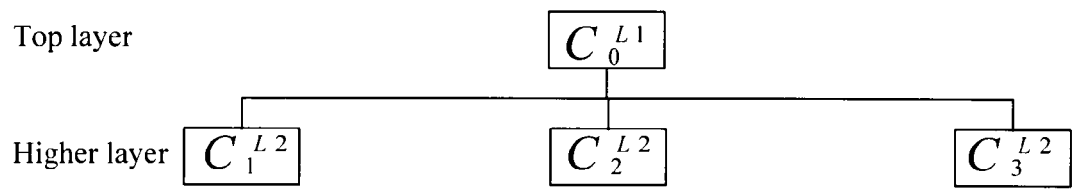

FIG. 5a and FIG. 5b show the use of a Class Tree (CT) structure to represent a change to classes of samples in a training process, respectively. In FIG. 5a, samples of seven classes of an object in total are involved in training, and the seven classes are arranged at the bottom layer Level3 of a tree and referred to as a "leaf class" $C_i^{L3}$; then some of the seven classes of samples are merged into three classes $C_i^{L2}$ at a higher layer Level2 of the tree according to a certain similarity criterion; and finally the three classes of Level2 are merged into one class $C_0^{L1}$ at the top layer Level1. As samples for use in training, firstly a class of samples at a higher layer is selected starting with Level1 of the CT, that is, an early goal of training of the classifier is to generally distinguish a target object from a non-target object; and when general distinguishing becomes difficult with progression of training, the class of samples is further divided into the three classes of samples of Level2 of the CT for use, and finally the samples of the seven leaf classes of the CT are used. Again FIG. 5b illustrates three classes of a car, a truck and a bus, which are "Leaf Classes" of a CT and merged into a root node class $C_0^{L1}$ of the CT. Corresponding training starts with $C_0^{L1}$, which is then divided into the three leaf classes $C_1^{L2}$ as appropriate. Of course, the respective classes of a car, a truck and a bus can further be divided into a plurality of finer subclasses after a vehicle is divided into the classes of a car, a truck and a bus.

According to the second embodiment of the invention, a training method of a detection device for detecting r classes of object data includes: training corresponding level classifiers starting with a class at the top layer in a from-coarse-to-fine policy, where each of the level classifiers includes strong classifiers, the number of which corresponds to the number of targeted classes, and the respective level classifiers are connected in series to form the detection device.

Where, training one of the level classifiers for detecting m classes includes:

preparing a set of positive samples and a set of negative samples respectively for m classes to be processed by the level classifier, where 1<m≤r;

determining among the m classes an optimum set of classes sharing features and selecting optimum features through traversing the features;

constructing weak classifiers using the selected optimum features for the respective classes in the optimum set of classes of feature-shared samples; and obtaining a features list of the current level strong classifier through selecting iteratively the optimum features and also constructing a group of weak classifiers respectively for the m classes, thereby obtaining the level classifier including m strong classifiers capable of processing the m classes.

As can be appreciated, a certain level classifier $SC_k$ of the cascade classifier is obtained from training of m classes of samples to be processed by the level classifier and includes m $H(C_i)$ classifiers respectively corresponding to the m classes of samples. Alike each of the strong classifiers $H(C_i)$ is obtained from a combination of a plurality of weak classifiers $h(C_i)$. The structure of a classifier $H(C_i)$ is as illustrated in FIG. 3b, and a weak classifier $h(C_i)$ exemplified with a decision tree is as illustrated in FIG. 3a.

The features used by the weak classifiers $h(C_i)$ are selected from a group of shared features $f_j$ of the level classifier $SC_k$. A training process of the level classifier $SC_k$ is a process of searching for the respective classifiers $H(C_i)$, that is, a process of searching for a plurality of weak classifiers $h(C_i)$ for the respective classes, and finally a process of searching for the features used by the respective weak classifiers, i.e., a process of selecting the features, thereby obtaining the group of shared features $f_j$.

In similar to the first embodiment, any feature in the group of shared features may be used respectively for a plurality of classes to construct weak classifiers, that is, it may be shared by the classes, but parameters of the weak classifiers will be calculated respectively from data of the respective classes, that is, no weak classifier will be shared among the classes.

As described above, firstly a class of samples at a higher layer is used for training, and a criterion of dividing a class of samples is set; and when the criterion is satisfied with progression of training, the current class is divided into finer classes of samples at a lower layer up to the bottom layer.

"A set criterion of dividing a class of samples" as used in the second embodiment can include supervised specifying of dividing into subclasses for the respective levels and forced manual dividing of a class of samples. For example, a first level classifier is specified for the top layer, second and third level classifiers are specified for higher layers, etc. Alternatively unsupervised automatic generation of subclasses for continued training can be adopted.

Alternatively in the second embodiment, an error in a training set can preferably be taken as a judgment criterion of dividing a class of samples. That is, an error in a training set is constantly reduced in normal training, and when it is difficult to further reduce the error in the set, it indicates that a great intra-class difference of a certain class of samples currently used prevents training from progressing and it is necessary to divide the class of samples. In this case, samples may be divided in a training process of respective level classifiers of other layers of classes than the bottom layer, so although one or more corresponding level classifiers are trained respectively for respective layers of classes in a predetermined multilayer structure according to a from-coarse-to-fine policy, no corresponding level classifier may be obtained from training for a certain layer of class, for example, with a great intra-class difference, particularly a class at the top layer. At the end of training, classes in a multilayer structure actually processed by respective level classifiers (a second multilayer structure according to the invention) may be distinguished from the predetermined multilayer structure manually predefined (the first multilayer structure according to the invention).

Specifically, for any level classifier intends to process other layers of classes than the class at the bottom layer (i.e., 1≤m<r), validity measurement is performed after the weak classifiers is constructed for the classes in an iteration process to judge whether to divide a class of samples.

The validity measurement includes:

a threshold of the strong classifier consisting of the currently constructed weak classifiers is set to zero and an error of classification by the strong classifier of the positive and negative samples of the corresponding class is checked;

it is judged whether the error of classification is gradually reduced with progression of iteration; and if it is judged that the error of classification is not gradually reduced with progression of iteration any more, reduced slowly or oscillated, then training of the level classifier is exited and after the coarser class of samples is divided into finer classes of samples at the next layer, the training of the level classifier is restarted.

As described above, the class at the top layer in the predetermined multilayer structure may be any number of classes but typically includes one class. According to the second embodiment, training of a level classifier for detection of the one class of object data includes: preparing a set of positive samples and a set of negative samples; training the weak classifiers with the candidate training features and selecting one of the weak classifiers with the least error of classification; and constructing the weak classifiers through iteration, thereby obtaining a first level classifier consisting of the constructed weak classifiers for generally distinguishing an object image from a non-object image. Alike the number of iterations can be predetermined or automatically judged under a training termination judgment condition.

Similarly for iterative training of any level classifier, the number of iterations thereof can be predetermined or automatically judged under a training termination judgment condition. For the training termination judgment condition, reference can be made to the description in the first embodiment, and a repeated description thereof will be omitted here.

A training termination judgment condition can be set for any level classifier, and also expected performance of training can be set for respective classes of an object as a whole (e.g., a total false detection rate $F_i$ is set for respective classes at the bottom layer), and if the expected performance is achieved for training of a certain class, then this class will be precluded from subsequent training of respective level classifiers.

The Third Embodiment

In the third embodiment, a classification (training) method for a cascade classifier will be further detailed taking a car, a bus and a truck as an object to be detected.

Firstly three sets of positive samples (images of a vehicle) $P(C_i)$ (i=1, 2, 3) respectively corresponding to a car, a bus and a truck are prepared and merged into one set of positive samples $P(C_0)$, and the structure of a tree of sample classes is as illustrated in FIG. 5b; training starts with $P(C_i)$ (i=0), and when it is necessary to divide the set of positive samples, $P(C_i)$ (i=0) is divided into $P(C_i)$ (i=1, 2, 3); and an expected goal of training of the respective classes is set to a detection rate Di and a total false detection rate $F_i$;

Secondly a pool of features is prepared by applying, for example, a Haar-like feature prototype to the images in 32×32 pixels to obtain hundreds of thousands of specific features.

Figure 6:
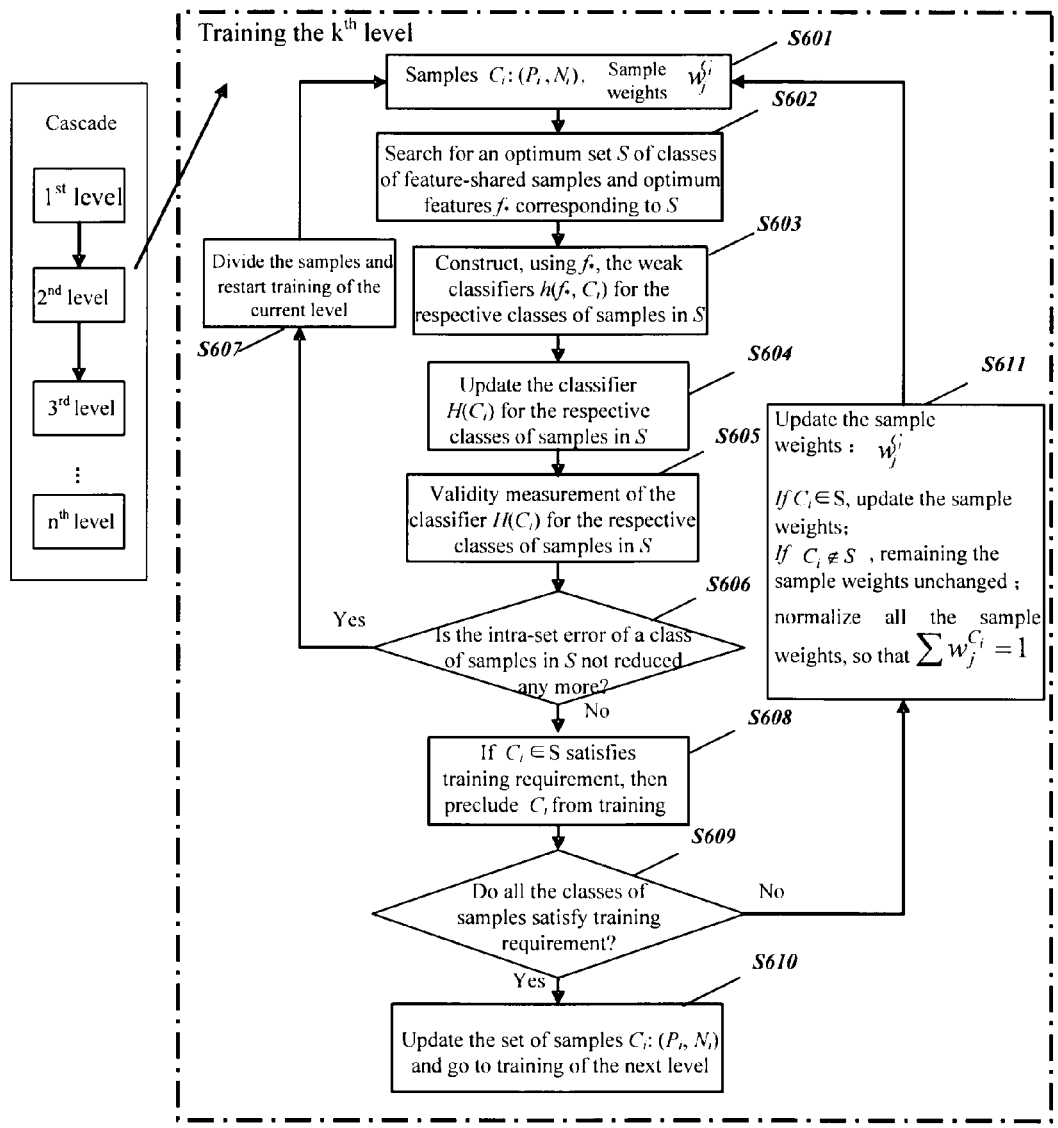
FIG. 6 illustrates a training method according to a third embodiment of the invention.

Then respective level classifiers $SC_1$ to $SC_n$ are trained step-by-step. Reference is made to FIG. 6 particularly illustrating the steps of training the $k^{th}$ level classifier $SC_k$ (k=1, 2, 3, . . . , n):

In the step S601, a set of positive samples $P_k^{C_i}$ is prepared respectively for the different classes, where i corresponds to the class of positive samples for the current level (one class or three classes), a set of positive samples $P(C_i)$ is filtered using the previous k−1 level classifiers and the current set of positive samples $P_k^{C_i}$ is obtained through removing those samples judged as −1. Each of the positive samples is labeled with $z_j^{C_i}=+1$.

Also in the step S601, a set of negative samples $N_k^{C_i}$ is prepared respectively corresponding to the set of positive samples $P_k^{C_i}$. The set of negative samples $N_k^{C_i}$ can be prepared for the respective classes by intercepting from a background image sub-pictures with the same size of the images in the positive samples in a certain sequence.

Preferably for the respective level classifiers starting with the second level classifier, preparing a set of negative samples for the related class $C_i$ includes window-searching throughout the background image with a cascade classifier consisting of $C_i$-related strong classifiers among all the previous existing level classifiers and adding a window image mistaken for a positive sample to the set of negative samples $N_k^{C_i}$ of $C_i$. The number of negative samples can be determined as needed in practice, for example, the number of negative samples of a certain class can be specified with a fixed proportion of the number of positive samples thereof. Each of the negative samples is labeled with $z_j^{C_i}=1$.

Here expected performance of training can be set for the respective classes of samples as a whole. For example, a current false detection rate of the class $C_i$ at the bottom layer is defined as $F_{C_i}=N_{neg}/N_{win}$ ($N_{neg}$ represents the number of negative samples obtained from searching, and $N_{win}$ represents the number of all the window images subject to searching), and if the false detection rate $F_{C_i}$ of the class $C_i$ has been less than the expected total false detection rate $F_i$, then the class $C_i$ will be precluded from subsequent training. If all the classes have a false detection rate less than the total false detection rate, then the entire training process is exited.

Also in the step S601, a weight $w_j^{C_i}=1/M$ (an initial weight is 1/M) is set for the respective samples, where M represents the total number of samples.

Also in the step S601, an exit condition of a level classifier can be set, for example, the number of iterations is specified as T, and here the expected least detection rate $d_i$ and the expected largest false detection rate $f_i$ is set for the respective classes of an object.

The steps from S602 are to select features by searching for a plurality of weak classifiers $h(C_i)$ for the respective classes and finally searching for the features used by the respective weak classifiers through iteration.

Let t=0, 1, . . . , and select the $t^{th}$ feature.

a) The step S602 is to search for an optimum set of classes of feature-shared samples (here those classes but not necessarily all of the classes among which the t features is shared are determined in a forward sequential selection method):

i. An error due to preclusion of the class $C_i$ from sharing of the feature is calculated for respective $P_k^{C_i}$ and $N_k^{C_i}$:

$$e_{NS,t}^{C_i} = \sum_j w_j^{C_i} z_j^{C_i} / \sum_j w_j^{C_i}$$

Weak classifiers are trained independently for the respective classes, that is, one feature with which the sets of positive and negative samples of the current class can be divided with the least error is selected from the pool of features, and the optimum features $f_t^{C_i}$ selected for the respective classes and their errors of classification $e_t^{C_i}$ are recorded; and $$e_{S1}(C_i) = e_i^{C_i} + \sum_{C_j \neq C_i} e_{NS,t}^{C_j}$$

are calculated for the respective classes $$\left( \sum_{C_j \neq C_i} e_{NS,t}^{C_j} \right)$$

represents an error due to preclusion thereof), and $$C_1^* = \underset{C_i}{\operatorname{argmin}}\left(e_{S1}^{C_i}\right)$$

(a value of $C_i$ minimizing $e_{S1}^{C_i}$) is taken as the first class coming preferentially into a candidate set S of classes of feature-shared samples to obtain a candidate set $S_1$ of classes of feature-shared samples;

$C_1^*$ is combined with the other respective classes, joint training of the weak classifiers for every two classes is performed, and the optimum features $f_t^{C_1^*, C_i}$ selected for the respective combinations and their errors of classification $e_t^{C_1^*, C_i}$ are recoded; and $$e_{S2}(C_i) = e_i^{C_1^*, C_i} + \sum_{C_j \neq C_i \& C_j \in S_1} e_{NS,t}^{C_j}$$

are calculated for the respective combinations, and $$C_2^* = \underset{C_i}{\operatorname{argmin}}\left(e_{S2}^{C_i}\right)$$

is taken as the second class of the candidate set S of classes of feature-shared samples to obtain a candidate set $S_2$ of classes of feature-shared samples;

And so on until all the classes are processed;

In all the foregoing obtained $S_x$, the set with the least error of sharing features is selected as the set S of classes of feature-shared samples, that is, $$S = \underset{S_x}{\operatorname{argmin}}(e_{S_x});$$

and the corresponding $f_t^{S_x}$ are recorded as the optimum features $f_t^*$.

b) In the step S603, the weak classifiers $h(f_t^*, C_i)$ is constructed as decision trees using $f_t^*$ for the respective classes in S and a structure thereof is as illustrated in FIG. 3a;

d) In the step S604, the classifier $H_t(C_i)$ is updated for the respective classes of samples in the set of classes of feature-shared samples: $(H_t(C_i) = H_{t-1}(C_i) + h(f_t^*, C_i))$, and a threshold $\Theta_t(C_i)$ of the classifier $H_t(C_i)$ is determined from the expected least detection rate $d_i$ (that is, with the current threshold, the detection rate of the classifier for the current set of positive samples is $d_i$);

d) In the step S605, validity measurement is performed on training of the respective classes of samples in the set S of classes of feature-shared samples: for example, the threshold of the classifier $H_t(C_i)$ of the respective classes of samples is set to zero, an error of classification by the classifier $H_t(C_i)$ of the positive and negative samples of the respective classes is checked, and it is judged in the step S606 whether the error is gradually reduced with progression of iteration. If the error is not reduced any more, reduced slowly or oscillated, then training of the $k^{th}$ level classifier $SC_k$ is exited and after the coarser class of samples is divided into finer classes of samples at the next layer (for example, as illustrated in FIG. 5b), the training of the $k^{th}$ level classifier $SC_k$ is restarted (see the step S607);

e) In the step S608, if the result of judgment in the step S606 is no, training termination judgment is performed (here with the expected largest false detection rate $f_i$). Specifically, for each of the classes belonging to the set S of classes of feature-shared samples ($C_i \in S$), a false detection rate $f(C_i) = N_{FA}/N_{Total}$ ($N_{FA}$ represents the number of samples in the set of negative samples mistaken by the classifier for a positive sample, and $N_{Total}$ represents the total number of negative samples) is checked, and if $f(C_i) < f_i$, then the class $C_i$ has satisfied a training termination condition and is precluded from training of the $k^{th}$ level classifier; and if all the classes of samples satisfy the training termination condition, then training of the $k^{th}$ level classifier terminates, and the set of samples $C_i$: $(P_i, N_i)$ is updated for training at the next level (see the steps S609 and S610).

f) In the step S611, the weights of the samples are updated for $C_i$ belonging to S ($C_i \in S$): $w_{j,t}^{C_i} = w_{j,t-1}^{C_i} \cdot \exp(-h(f_t^*, C_i, x_j) \cdot z_j^{C_i})$ while remaining the weights of the samples unchanged for $C_i \notin S$, and all the weights of the samples are normalized so that $\Sigma w_{j,t}^{C_i} = 1$ for the next iteration.

It shall be noted that if only one class is judged for the first several classifiers $SC_k$ (k=1, 2, 3, . . . , n), particularly the first level classifier $SC_1$, then it is not necessary search for a set S of classes of feature-shared samples, for example, in a forward sequential selection method, to select features for the level classifier. If classes of samples at the bottom layer have been trained for the last several classifiers $SC_k$, then it is not necessary to perform validity measurement to judge whether to divide the classes of samples.

It shall further be noted that training of the detection device will not be limited to any specific Boosting algorithm but can be performed with another algorithm of Gentle-Boosting, a Real-Boosting, etc.

Detection Device and Method of the Second and Third Embodiments

Figure 7:
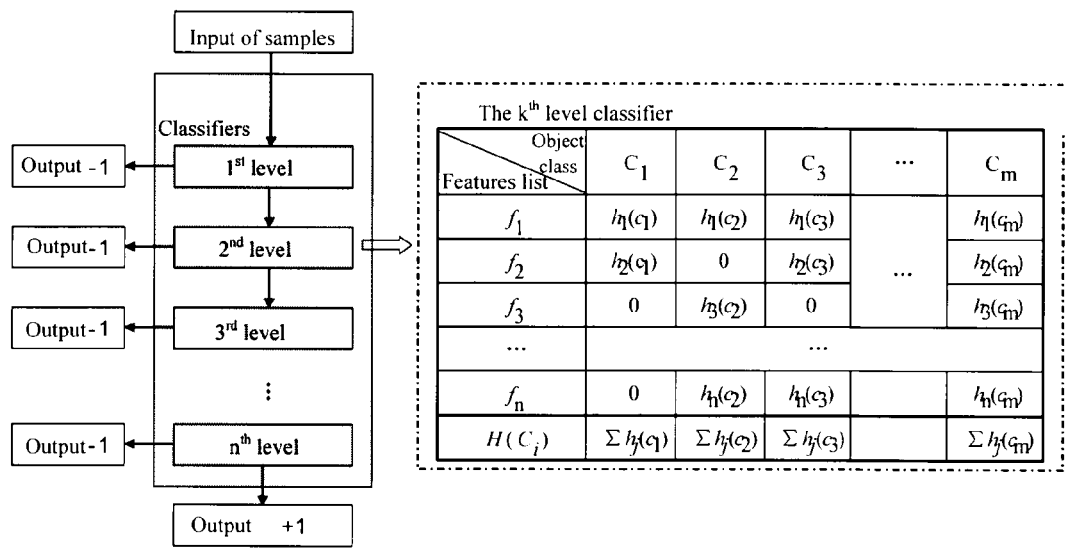
FIG. 7 illustrates classifiers of the detection device obtained from the training method according to the second or third embodiment of the invention.

The detection device obtained from the training method according to the second or third embodiment includes: an input unit configured to input data to be detected; and a cascade classifier, as illustrated in FIG. 7, including a plurality of (n) level classifiers connected in series.

Here the plurality of (r) classes can be merged into a predetermined multilayer structure step-by-step according to a similarity criterion and arranged at the bottom layer as the most finely classified classes, and correspondingly the plurality of level classifiers are configured to perform a classification on the classes at respective layers in the predetermined multilayer structure according to a from-coarse-to-fine policy and each of the level classifiers includes strong classifiers, the number of which corresponds to the number of the processed classes.

Each of the strong classifiers includes a group of weak classifiers, each of which perform a weak classification on the data to be detected using a feature, where each of level classifiers includes a shared features list, and each feature in the shared features list is shared by one or more weak classifiers respectively belonging to different strong classifiers; and the weak classifiers using a same feature and belonging to different strong classifiers have parameter values different from one another.

The detection device according to the second or third embodiment can be regarded as a whole a cascade classifier consisting of a plurality of "Level classifiers" SC connected in series, but it has been designed to detect concurrently a plurality of classes of an object, and the strong classifiers of the plurality of classes in the respective level classifiers are combined together by the shared features list (i.e., a group of shared features).

Taking the detection device according to the third embodiment as an example, the data to be detected is input sequentially to the respective level classifiers of the cascade classifier.

Particularly, the data to be detected coming into a certain level classifier is judged sequentially by m strong classifiers included in this level classifier, and if +1 is output from a certain strong classifier, then it is judged by this strong classifier as belonging to an object of a corresponding class, which is referred to as being passed by the strong classifier; otherwise, −1 is output, and it is judged as an object of other than the corresponding class, which is referred to as being rejected by the strong classifier.

Particularly the judgment process is as follows: the values of all valid features in the features list of the current level classifier are calculated; and outputs of the respective weak classifiers are determined from the calculated values of the features sequentially according to sharing of the respective features in the features list for the m strong classifiers at this level and summed up to obtain a final output of the strong classifiers.

In the judgment process, if the data to be detected is rejected by a certain strong classifier for detection of the class $C_i$ then the input data to be detected will no longer be judged by the corresponding strong classifier for detection of the class $C_i$ and sub-classes thereof in a subsequent level classifier, which is referred to as rejection of the data to be detected by a class at a leaf layer corresponding to the class $C_i$.

In the judgment process, such a feature in the features list of the respective level classifiers that is correlated only with the respective strong classifiers precluded from the judgment process is regarded as an invalid feature, which is precluded from calculation to save a cost of calculation.

In the judgment process, if the data to be detected is rejected by all the classes at leaf layers, then the judgment process is terminated and the data to be detected is referred to as non-object data. At the end of the judgment process, if the data to be detected is passed by a certain strong classifier of the last level classifier, then the data to be detected is judged as having an object-class-attribute corresponding to the strong classifier, and if the data to be detected is passed by a plurality of strong classifiers of the last level classifier, then the data to be detected is judged as having a corresponding multi-object-class-attribute.

The detection device according to the invention can detect a variety of multi-class object data, and in the case of detecting a plurality of classes of a predetermined object in an input image or video, the detection device according to the invention can further include a window traversal component configured to perform window-traversal on the image or video to be detected and a post processing component configured to merge windows generated by the window traversal component and to filter with a predetermined threshold the merged windows, thereby obtaining a final detection result.

Figure 8:
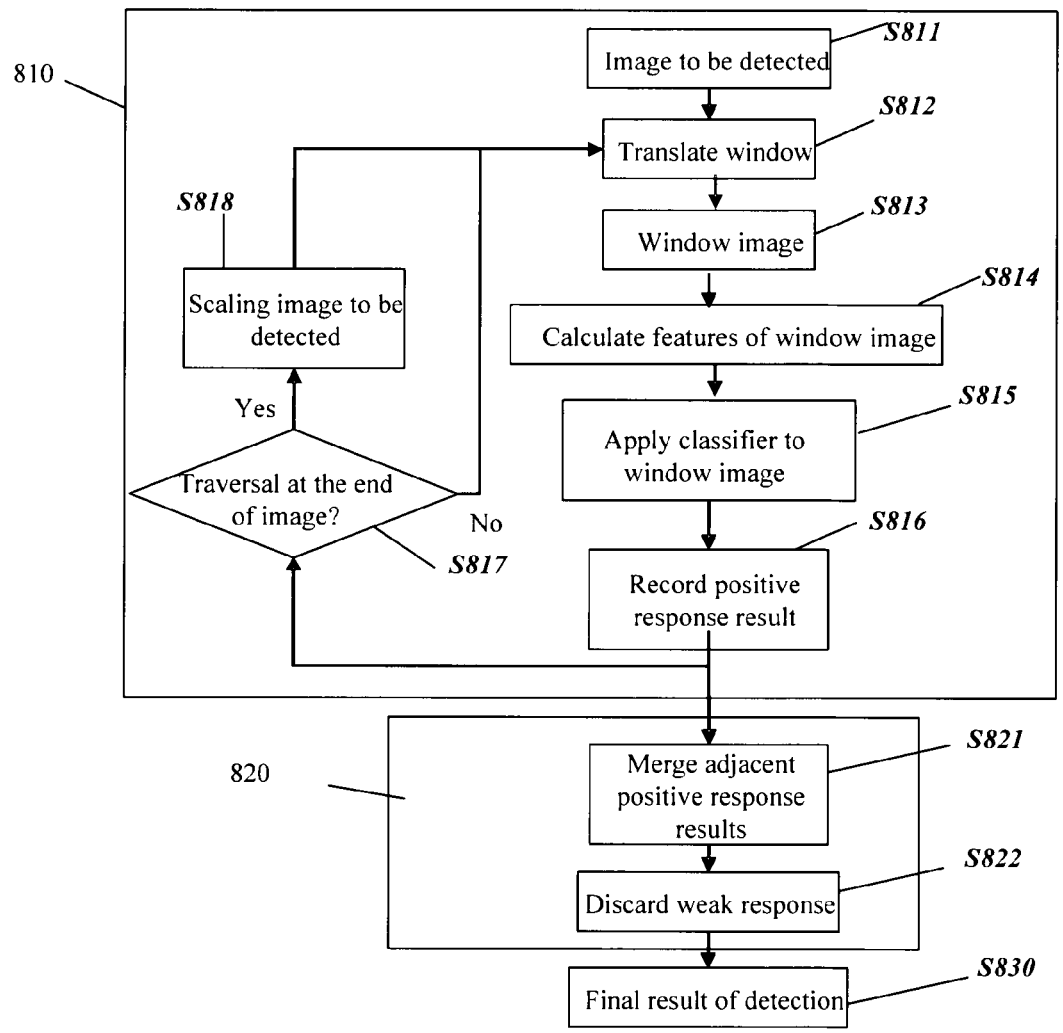
FIG. 8 illustrates a flow of detecting a predetermined multiclass object in an image or video in a detection device according to the invention.

FIG. 8 illustrates a flow of detecting a predetermined multiclass object in an image or video in the detection device according to the invention.

A window traversal process 810 is to traverse with a rectangular window any given image to be detected (the step S811) or an image intercepted from a video to be detected (the step S812). In the step S813, window images are sequentially acquired (where the order and manner of traversal can be arbitrary, e.g., from left to right and from top to down or from right to left and from bottom to top; and the step by which the window is translated during traversal can be arbitrary, e.g., per pixel or every more than one pixel or in a proportional relationship to the size of the current window).

During traversal, a cascade classifier is applied to the respective windows obtained from scanning, and features of a window image are calculated from features in the classifier obtained from training (the step S814) and the window image is classified with the classifier (the step S815). If the cascade classifier judges the window image as an object class (as having more than one object-class-attribute), then the position and the size of the window in the original image and all the object-class-attributes thereof are recorded (the step S816). At the end of window-traversal, the image is shrunk by a specific scaling factor, and the window-traversal and window image judgment processes are performed again. The foregoing processes are repeated until the image is such shrunk that window-traversal can not be performed (the height of the image is smaller than the height of the window or the width of the image is smaller than the width of the image) (see the steps S817 and S818). The respective windows with a positive response are mapped to the original image by the size scaling factors of their corresponding images relative to the original image, thereby obtaining the positions and the sizes of the respective responses in the original image.

As an alternative to the foregoing mode of WinScanMode1 (that is, the image is traversed with a window of a selected fixed size, and at the end of traversal, the size of the image is shrunk or enlarged by a specific scaling factor and the image is traversed with the window of the fixed size), the image can be traversed in a mode of WinScanMode2 where the size the image remains unchanged, the size of the window for initial traversal is selected, and at the end of traversal, the size of the window is shrunk or enlarged by a specific scaling factor and the original image is traversed again.

After the respective window images are judged with the cascade classifier obtained from training, if the result of classification is +1, then if WinScanMode1 is selected, then the size and the position of the current window are recorded and mapped back to the coordinate space of the original image by the scaling factor of the image, thereby obtaining the position and the size of the current response in the original image; and if WinScanMode2 is selected, then the size and the position of the current window are recorded directly.

A post processing flow 820 is performed by the post processing component and includes the step S821 of merging the windows so as to merge adjacent positive response results and the step S822 of filtering the responses with a threshold to discard those weak responses and taking the result of merging remaining after merging of the windows and filtering with the threshold as a final detection result (the step S830).

Specifically, a plurality of responses may occur in the vicinity of the same object (a vehicle) in the image, and the responses in the vicinity can be merged into an output response.

Firstly, in the merging process, the "vicinity" is defined as having an adjacent position of window center, a similar size scaling and the same object-class-attribute, and then the average central position and the average window size of a cluster of object windows in the vicinity are calculated, and the number of merged windows is taken as a confidence of the result of merging.

Secondly, in the merging process, the object attributes of the results of merging with an adjacent central position and a similar size after merging are merged, that is, if there are a plurality of results of merging with different object attributes in the vicinity of a certain position in the image, then the numbers of the respective object attributes are calculated, one of the object attributes with the largest number is taken as a final object attribute, and the sum of confidence of the respective object attributes is taken as a confidence of the final result of merging.

At the end of the merging process, if the confidence of the merged windows is above or equal to a preset threshold of confidence, then the result of merging is accepted; otherwise, the result of merging is discarded.

Technical Effects

1. According to the respective embodiments of the invention, features are shared among classifiers of a plurality of class of object but weak classifiers related to the shared features are constructed separately in respective classes so that the respective classes of an object can be distinguished from one another while improving a convergence speed of training and also the performance of a joint classifier to distinguish among the respective classes of an object. A manner in which the features may not be specified strictly to be shared among all the classes dispenses with unnecessary calculation.

2. According to the respective embodiments of the invention, sharing of features among a plurality of class of classifiers allows a lower cost of calculating the features of the plurality of class of classifiers.

For example in the third embodiment of the invention, there are given 17000 samples in total of three classes of a vehicle (a car, a truck and a bus), and three parallel cascade classifiers and one joint classifier in which features are shared are trained respectively, and then the numbers of Haar-like features used by the obtained classifiers through training are as shown in the table below:

|  | Car | Truck | Bus | Joint classifier |
|---|---|---|---|---|
| The number of used features | 571 | 270 | 516 | 567 |
| The total number of features in comparison | 571 + 270 + 516 = 1357 |  |  | 567 |

As can be apparent from the above table, the number of used features can be greatly reduced in the method according to the embodiment of the invention.

An open test set of a vehicle (the samples in the set are not involved in training and include 2264 samples in total of three classes of a vehicle) and a test set of background images (with different sizes and providing approximately 5300000 window images). The test sets are processed with the cascade classifiers of the three classes of a vehicle in parallel and then with the joint classifier in which features are shared, and the results of test are as shown in the table below:

|  | Detection rate | Period of time for processing the test set of a vehicle | False detection rate | Period of time for processing background images |
|---|---|---|---|---|
| Parallel classifiers | 90.86% | 0.110 s | 1.27e−5 | 72.399 s |
| Joint classifier | 91.43% | 0.102 s | 2.87e−5 | 45.980 s |

As can be apparent from the above table, the two solutions have similar performance of classification, but the joint classifier is more efficient in detection. The more complex calculation of the features used by the classifiers is, the more apparent superiority of the detection efficiency of the joint classifier is.

3. According to the second and third embodiments, the joint classifier distinguishes (a plurality of) object image from a non-object image and reflects to the greatest extent differences between respective classes of an object. With the from-coarse-to-fine use of multilayer classes of samples, the joint classifier preferentially reflects the overall difference between an object and a non-object and then considers the difference between the classes of an object, thereby further improving the efficiency of detection.

4. According to the second and third embodiments, the set of negative samples is used independently for the respective classes in multiclass joint training to facilitate the use of the cascade structure form for the feature-shared classifiers for higher efficiency of detection.

Other Embodiments

It shall further be noted that the foregoing series of processes and device can also be embodied in software and firmware. In the case of being embodied in software and firmware, programs constituting the software are installed from a storage medium or a network into a computer with a dedicated hardware structure, e.g., a general-purpose computer 900 illustrated in FIG. 9. The computer, when installed with various programs, is capable of performing various functions.

Figure 9:
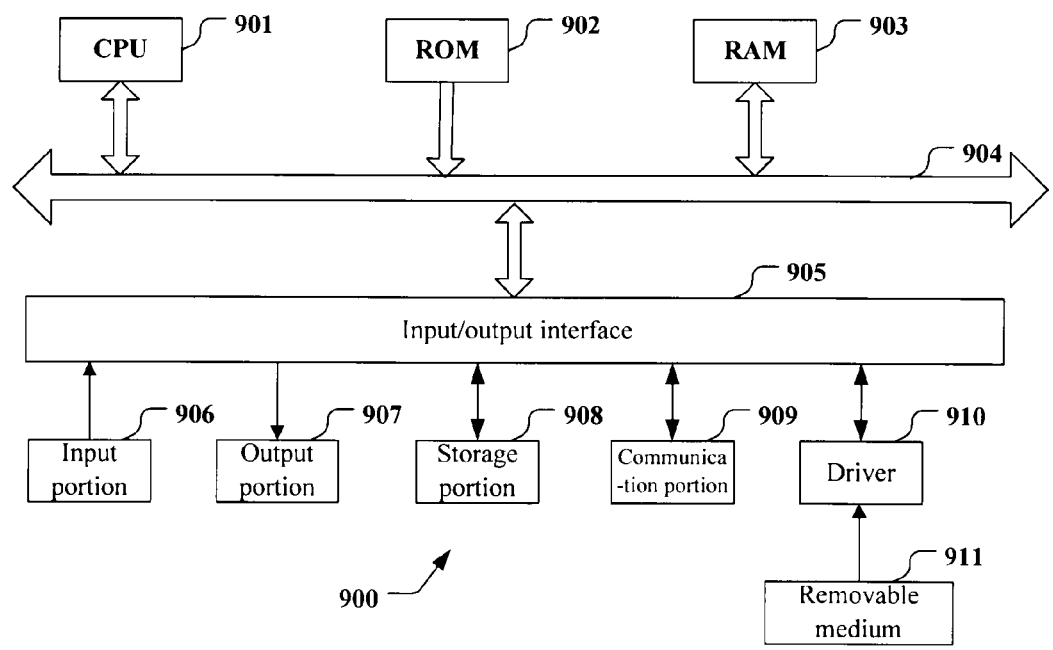
FIG. 9 is a block diagram illustrating an illustrative structure of a computer in which the invention is embodied.

In FIG. 9, a Central Processing Unit (CPU) 901 performs various processes according to programs stored in a Read Only Memory (ROM) 902 or programs loaded from a storage portion 908 into a Random Access Memory (RAM) 903. The RAM 903 also stores the data required for the CPU 901 to perform the various processes as needed.

The CPU 901, the ROM 902 and the RAM 903 are connected to one another via a bus 904. An input/output interface 905 is also connected to the bus 904.

The following components are also connected to the input/output interface 905: an input portion 906 including a keyboard, a mouse, etc.; an output portion 907 including a display, e.g., a Cathode Ray Tube (CRT) display, a Liquid Crystal Display (LCD), etc., and a speaker, etc.; a storage portion 908 including a hard disk, etc,; and a communication portion 909 including a network interface card, e.g., an LAN card, a modem, etc. The communication portion 909 performs a communication process over a network, e.g., the Internet, etc.

As needed, a driver 910 is also connected to the input/output interface 905. A removable medium 911, e.g., a magnetic disk, an optical disk, an optic-magnetic disk, a semiconductor memory, etc., is installed on the driver 910 as needed so that computer programs read therefrom can be installed into the storage portion 908 as needed.

In the case that the foregoing series of processes are realized in software, programs constituting the software are installed from a network, e.g., the Internet or a storage medium, e.g., a removable medium 911.

Those skilled in the art can appreciate that the storage medium will not be limited to the removable medium 911 illustrated in FIG. 9 in which the programs are stored and which is distributed separately from a device to provide a user with the programs. Examples of the removable medium 911 include a magnetic disk (including a Floppy Disk (a registered trademark)), an optical disk (including a Compact Disk-Read Only Memory (CD-ROM) and a Digital Versatile Disk (DVD)), an optic-magnetic disk (including a Mini Disk (MD) (a registered trademark)) and a semiconductor memory. Alternatively the storage medium may be an ROM 902, a hard disk included in the storage portion 908, etc., in which the programs are stored and which is distributed together with a device including them to the user.

The preferred embodiments of the invention have been described above. Those ordinarily skilled in the art shall appreciate that the scope of protection of the invention will not be limited to the specific details disclosed here but various variations and equivalents are possible without departing from the spirit of the invention.

What is claimed is:

1. A detection device for detecting a plurality of classes of object data, wherein the plurality of classes are merged step-by-step into a predetermined multilayer structure according to a similarity criterion and arranged at a bottom layer as the most finely classified classes, the detection device comprising:

an input circuit configured to input data to be detected; and
a processor configured to execute a cascade classifier comprising a plurality of level classifiers connected in series, the plurality of level classifiers configured to perform a classification respectively on the classes at respective layers in the predetermined multilayer structure according to a from-coarse-to-fine policy, and each of the level classifiers comprising strong classifiers, a number of which corresponds to a number of the classes being classified, wherein each of the strong classifiers comprises a group of weak classifiers, and each of the weak classifiers is configured to perform a weak classification on the data to be detected using a feature, each of the level classifiers comprises a shared features list, each feature in the shared features list is shared by one or more weak classifiers respectively belonging to different strong classifiers, and the weak classifiers using a same feature and belonging to different strong classifiers have parameter values different from one another, and the cascade classifier is configured to
 subject the data to be detected sequentially to judgment by each of the strong classifiers in each of the level classifiers so that when the data to be detected is judged by one of the strong classifiers of a level classifier as non-object data, the data to be detected is precluded from judgment by the other strong classifiers of the level classifier and sub-classes in the subsequent level classifiers,
 judge, for each of the level classifiers, whether there is a feature in the shared features list that is correlated only with the respective strong classifiers precluded from the judgment, and
 label the feature, when the cascade classifier judges that the feature is correlated only with the respective strong classifiers precluded from the judgment, as an invalid feature for which no feature value is further calculated.

2. The detection device according to claim 1, wherein each of the level classifiers is further configured to calculate feature values of respective valid features in the shared feature list for the data to be detected, and to query, for each of the strong classifiers in the level classifier, a feature values list obtained from calculation according to the features used for the strong classifier to thereby determine and sum up outputs of the respective weak classifiers of the strong classifier to obtain a final output of the strong classifier.

3. The detection device according to claim 1, wherein the cascade classifier is configured to terminate the classification and judge the data to be detected as non-object data when the data to be detected is rejected by all of the strong classifiers in any one of the level classifiers.

4. The detection device according to claim 1, wherein a last one of the level classifiers further comprises a judgment unit configured to judge the data to be detected as having an object-class-attribute corresponding to a certain strong classifier when the data to be detected is passed by the strong classifier, and to judge the data to be detected as having a corresponding multi-object-class-attribute when the data to be detected is passed by the plurality of strong classifiers of the last one of the level classifier.

5. The detection device according to claim 1, which is for detecting a plurality of classes of a predetermined object in an input image or video, further comprising:
a window traversal circuit configured to perform window-traversal on an image to be detected or on an image intercepted from an video to be detected, and
the cascade classifier is configured to perform a classification on a window image acquired by the window traversal circuit and to record a position and a size of the window image and all the object-class-attributes thereof when the window image is judged as an object class.

6. A detection method for detecting a plurality of classes of object data, wherein the plurality of classes are merged step-by-step into a predetermined multilayer structure according to a similarity criterion and arranged at a bottom layer as the most finely classified classes, the detection method comprising:
inputting data to be detected; and
performing a classification on the data to be detected with a cascade classifier comprising a plurality of level classifiers connected in series, the plurality of level classifiers configured to perform a classification respectively on the classes at respective layers in the predetermined multilayer structure according to a from-coarse-to-fine policy, and each of the level classifiers comprising strong classifiers, a number of which corresponds to a number of the classes being classified, wherein
the performing a classification with the cascade classifier comprises subjecting the data to be detected sequentially to judgment by the respective strong classifiers in the respective level classifiers,
each of the level classifiers comprises a shared features list, each feature in the shared features list is shared by one or more weak classifiers respectively belonging to different strong classifiers, and the weak classifiers using a same feature and belonging to different strong classifiers have parameter values different from one another,
the subjecting the data to be detected sequentially to judgment by each of the strong classifiers in each of the level classifiers includes, when the data to be detected is judged by one of the strong classifiers of a level classifier as non-object data, the data to be detected is precluded from judgment by the other strong classifiers of the level classifier and sub-classes in the subsequent level classifiers, and the subjecting the data to be detected sequentially to judgment by the respective strong classifiers in each of the level classifiers further comprises:

judging whether there is a feature in the shared features list of the level classifier, which is correlated only with the respective strong classifiers precluded from the judgment; and labeling the feature, when the feature is correlated only with the respective strong classifiers precluded from the judgment, as an invalid feature for which no feature value is further calculated.

7. The detection method according to claim 6, wherein the subjecting the data to be detected sequentially to judgment by the respective strong classifiers in each of the level classifiers comprises:

for the input data to be detected, calculating feature values of respective valid features in the shared features list of the level classifier; and for each of the strong classifiers in the level classifier, querying a feature values list obtained from calculation according to the features used for the strong classifier to thereby determine and sum up outputs of the respective weak classifiers of the strong classifier to obtain a final output of the strong classifier.

8. The detection method according to claim 6, wherein the performing a classification with the cascade classifier further comprises:

terminating the classification and judging the data to be detected as non-object data when the data to be detected is rejected by all of the strong classifiers in any one of the level classifiers.

9. The detection method according to claim 6, further comprising, after classification with a last one of the level classifier:

judging the data to be detected as having an object-class-attribute corresponding to a certain strong classifier when the data to be detected is passed by the strong classifier; and judging the data to be detected as having a corresponding multi-object-class-attribute when the data to be detected is passed by the plurality of strong classifiers of the last one of the level classifier.

10. The detection method according to claim 6, which is used for detecting a plurality of classes of a predetermined object in an input image or video, further comprising:

performing a window-traversal on an image to be detected or on an image intercepted from a video to be detected, and the performing a classification on the data to be detected with the cascade classifier comprising performing a classification on a window image acquired by the window-traversal with the cascade classifier and recording a position and a size of the window image and all the object-class-attributes thereof when the window image is judged as an object class.

11. The detection method according to claim 10, further comprising merging windows in a local vicinity with the object-class-attributes generated by the window traversal component.

12. The detection method according to claim 11, wherein the merging the windows in the local vicinity comprises:

for the windows with a position adjacent the window center, a similar size scaling and the same object-class-attributes, calculating an average central position and an average window size of a cluster of object windows in the vicinity, and taking the number of merged windows as a confidence of the result of merging;

merging the object attributes of the results of merging with an adjacent central position and a similar size after merging, wherein when there are a plurality of results of merging with different object attributes in the vicinity of a certain position in the image, a sum of confidence of the respective object attributes a calculated, one of the object attributes with the largest sum of confidences is taken as a final object attribute, and a sum of the sums of confidence of the respective object attributes is taken as a confidence of the final result of merging;

when the confidence of the final result of merging is above or equal to a preset threshold of confidence, the final result of merging is accepted; and when the confidence of the final result is below the preset threshold of confidence, the final result of merging is discarded.

13. A non-transitory computer-readable medium including executable instructions that when executed by a processor cause the processor to execute a detection method for detecting a plurality of classes of object data, wherein the plurality of classes are merged step-by-step into a predetermined multilayer structure according to a similarity criterion and arranged at a bottom layer as the most finely classified classes, the detection method comprising:

inputting data to be detected; and performing a classification on the data to be detected with a cascade classifier comprising a plurality of level classifiers connected in series, the plurality of level classifiers configured to perform a classification respectively on the classes at respective layers in the predetermined multilayer structure according to a from-coarse-to-fine policy, and each of the level classifiers comprising strong classifiers, a number of which corresponds to a number of the classes being classified, wherein the performing a classification with the cascade classifier comprises subjecting the data to be detected sequentially to judgment by the respective strong classifiers in the respective level classifiers, each of the level classifiers comprises a shared features list, each feature in the shared features list is shared by one or more weak classifiers respectively belonging to different strong classifiers, and the weak classifiers using a same feature and belonging to different strong classifiers have parameter values different from one another, the subjecting the data to be detected sequentially to judgment by each of the strong classifiers in each of the level classifiers includes, when the data to be detected is judged by one of the strong classifiers of a level classifier as non-object data, the data to be detected is precluded from judgment by the other strong classifiers of the level classifier and sub-classes in the subsequent level classifiers, and the subjecting the data to be detected sequentially to judgment by the respective strong classifiers in each of the level classifiers further comprises:

judging whether there is a feature in the shared features list of the level classifier, which is correlated only with the respective strong classifiers precluded from the judgment; and labeling the feature, when the feature is correlated only with the respective strong classifiers precluded from the judgment, as an invalid feature for which no feature value is further calculated.

* * * * *

UNITED STATES PATENT AND TRADEMARK OFFICE
CERTIFICATE OF CORRECTION

PATENT NO. : 8,843,424 B2
APPLICATION NO. : 13/257617
DATED : September 23, 2014
INVENTOR(S) : Shuqi Mei et al.

It is certified that error appears in the above-identified patent and that said Letters Patent is hereby corrected as shown below:

On the title page, Item (75), the 1st Inventor's First Name is incorrect. Item (75) should read:

--(75) Inventors: Shuqi Mei, Beijing (CN);
Weiguo Wu, Beijing (CN)--

Signed and Sealed this
Sixth Day of January, 2015

Michelle K. Lee
*Deputy Director of the United States Patent and Trademark Office*